United States Patent
Mathur

(10) Patent No.: US 10,776,336 B2
(45) Date of Patent: Sep. 15, 2020

(54) DYNAMIC CREATION AND MAINTENANCE OF MULTI-COLUMN CUSTOM INDEXES FOR EFFICIENT DATA MANAGEMENT IN AN ON-DEMAND SERVICES ENVIRONMENT

(71) Applicant: salesforce.com, inc., San Francisco, CA (US)

(72) Inventor: Rohitashva Mathur, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 440 days.

(21) Appl. No.: 15/344,326

(22) Filed: Nov. 4, 2016

(65) Prior Publication Data

US 2018/0129691 A1  May 10, 2018

(51) Int. Cl.
G06F 16/20 (2019.01)
G06F 16/22 (2019.01)
G06F 16/2455 (2019.01)
G06F 16/2457 (2019.01)

(52) U.S. Cl.
CPC .... *G06F 16/2272* (2019.01); *G06F 16/24553* (2019.01); *G06F 16/24578* (2019.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

*Primary Examiner* — Jau Shya Meng
(74) *Attorney, Agent, or Firm* — Jaffery Watson Mendonsa & Hamilton LLP

(57) ABSTRACT

A method, system, and apparatus provide for multiple custom fields associated with an application running at a computing device, where the multiple custom fields are received in a specified sort order. The method includes dynamically building multi-column indexes of the multiple custom fields corresponding to multiple intrinsic datatypes stored in multiple custom field columns of a shared table, where the multiple intrinsic datatypes are converted into a generic-indexable datatype to preserve the specified sort order. The method further includes building a sorted index in a specified order in a multi-column indexable table, where the multi-column indexable table includes a partial copy of data from multiple tenants that inhibit the shared table.

14 Claims, 10 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,082,128 B1 * | 7/2006 | Aggarwal ............... H04L 45/00 370/389 |
| 7,289,976 B2 | 10/2007 | Kihneman et al. |
| 7,340,411 B2 | 3/2008 | Cook |
| 7,620,655 B2 | 11/2009 | Larsson et al. |
| 7,634,461 B2 * | 12/2009 | Oral ....................... G06F 16/93 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0148487 A1 * | 7/2004 | Mori ................... G06F 16/9014 711/216 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0080303 A1 * | 4/2006 | Sargent ................... G06F 16/31 |
| 2007/0088734 A1 * | 4/2007 | Krishnamurthy ..... G06F 17/241 |
| 2009/0177744 A1 | 7/2009 | Marlow et al. |
| 2014/0201187 A1 * | 7/2014 | Larson ................ G06F 16/2228 707/711 |
| 2016/0182327 A1 * | 6/2016 | Coleman, Jr. ........... G06F 21/33 370/329 |

* cited by examiner

DYNAMIC CREATION AND MAINTENANCE OF MULTI-COLUMN CUSTOM INDEXES FOR EFFICIENT DATA MANAGEMENT IN AN ON-DEMAND SERVICES ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to facilitating dynamic creation and maintenance of multi-column custom indexes for efficient data management in an on-demand services environment.

BACKGROUND

Databases are commonly used to store large amounts of data. As the amount of data increases, so too does complications in management of such data, such as in terms of complexities associated with database tables. For example, today's multitenant architecture employs custom indexes to perform fast queries against custom data of various types stored in the same database table columns. However, such structures are often subject to rapid increases, also referred to as "exponential explosion", in column combinations, where database columns are needed to support a custom index over M columns and N datatypes (N exp M or $N^M$) because native indexes are created on all possible ordered datatype combinations of size M.

Such conventional techniques are not scalable or dynamic and thus do not offer custom indexes, linguistic compatibility, etc., and further, such techniques result in high storage overhead, impractical index management, and reduced memory efficiency.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
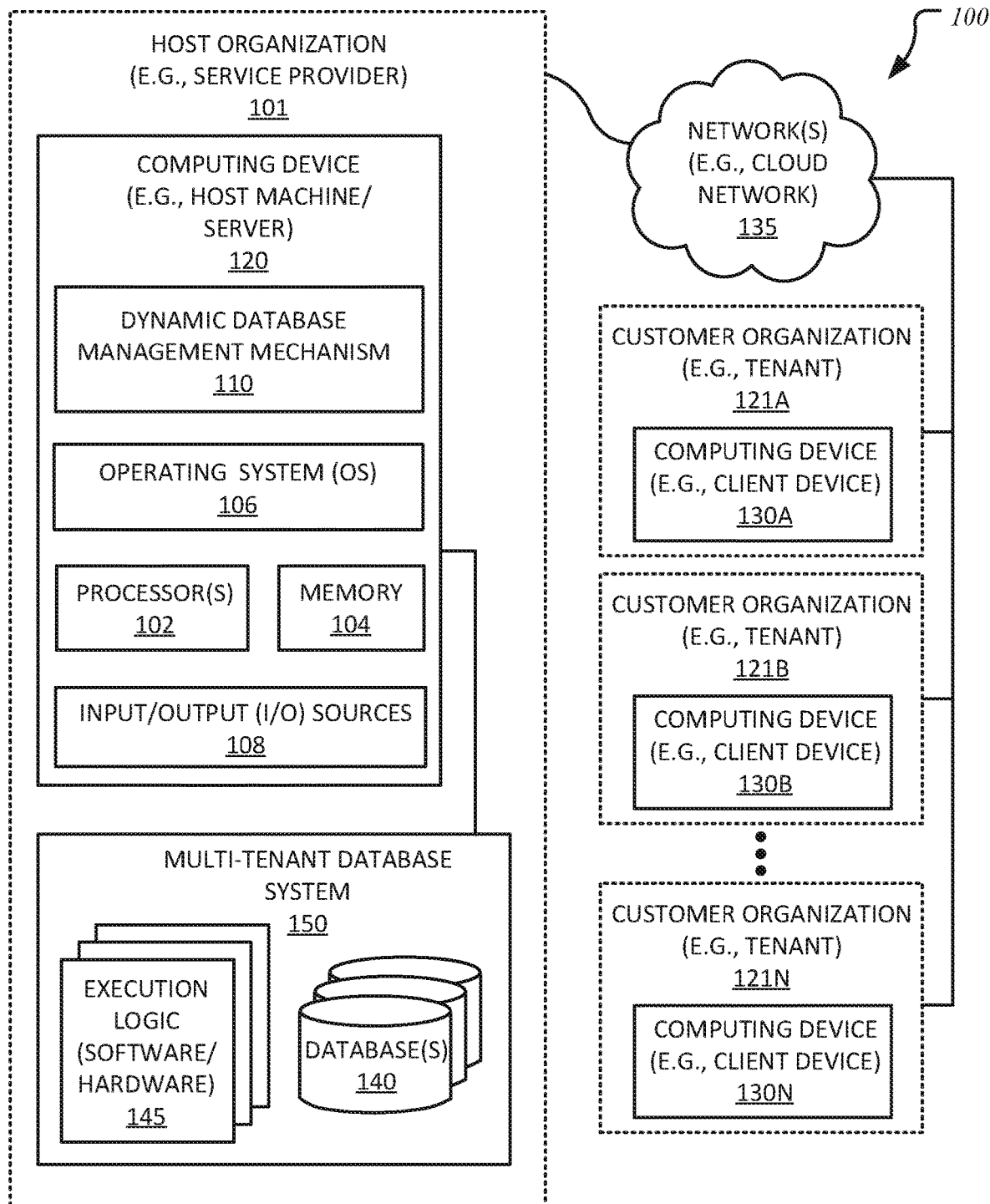
FIG. 1 illustrates a system having a computing device employing a dynamic database management mechanism according to one embodiment.

In the following description, numerous specific details are set forth. However, embodiments of the invention may be practiced without these specific details. In other instances, well-known circuits, structures and techniques have not been shown in detail in order not to obscure the understanding of this description.

Methods and systems are provided for facilitating dynamic creation and maintenance of multi-column custom indexes for efficient data management in an on-demand services environment.

Embodiment provide for a novel technique to account for and control exponential growth in database tables, while supporting all properties of a native multi-column index (e.g., access operations for equality, ranges, etc.) and allowing for dynamically creating and maintaining custom multi-column indexes and multiple linguistic indexes. For example, in one embodiment, this novel technique allows for keeping the same logical column combinations, while reducing the number of physical columns to reduce to a number of columns in the multi-column index that is being created along with a small constant number of housekeeping columns. Further, in one embodiment, one or more properties may be used to speed up any queries issued against the base table.

As aforementioned, the exponential explosion in database tables is used to support a custom index over M columns and N datatypes (N exp M) because native indexes are created on all possible ordered datatype combinations of size M. Embodiments provide for a novel technique where each of the N datatypes that any of the M columns can assume is encoded to one common datatype and thus needing one native index. For example, of the housekeeping columns, one column may be used to capture an ordered data type combination, while another column is used to capture the language (also referred to as "linguistic locale" or simply "locale") for text numbers.

Embodiments further provide for a novel technique for encoding from a given datatype to a common datatype such that the same comparison order is retained even after encoding. This property allows for having equally efficient access operations against the index on the common datatype, as when the native index is on actual datatypes. Further, the issued Structured Query Language (SQL) is cognizant of this translation and may be used to invoke any supplied encoding functions that convert other datatypes into a common datatype, such as when accessing a custom index table.

Embodiments provide for a novel technique that overcomes any issues relating to exponential explosion by, for example, encoding and storing all indexable data in an indexable-generic datatype that preserves the ordering of the original data. The indexable-generic datatype is implemented using a single intrinsic datatype supported by the underlying database engine. In a conventional database engine, integer and raw are suitable datatypes, for which encoding formulae applicable to other intrinsic datatypes can be devised. Alternatively, text may be used with Base64 or similar encoding, but without as much storage efficiency as an intrinsic datatype that is not expected to contain valid characters. Character based languages, such as Japanese, Chinese, Korean, etc., can be encoded in a pattern that preserves a linguistically proper ordering of character combinations, while encoding of data applies across languages and data types.

In some embodiments, this novel technique can be further enhanced using truncated versions of datafields, such as a date type indexed by year-month-day, ignoring hour-minute-second-millisecond data. Encoding that produces potential collisions may be handled at query time, trading gains in caching of small indexes for the cost of sorting through more retrieved records than are fully responsive to a query. Further, it is contemplated and to be noted that this novel technique is not merely limited or beneficial to a single or any particular architecture belonging to any particular service provider and that embodiments are fully applicable to and workable with any number and type of generic tables to build indexes on them, whether or not such tables follow that service provider's paradigm of storing different types of data in the same column.

It is contemplated that embodiments and their implementations are not merely limited to multi-tenant database system ("MTDBS") and can be used in other environment, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a dynamic database management mechanism 110 according to one embodiment. In one embodiment, computing device 120 includes a host server computer serving a host machine for employing dynamic database management mechanism ("database mechanism") 110 for facilitating dynamic creation and maintenance of multi-column custom indexes for efficient data management in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of database mechanism 110.

Similarly, the term "user" may refer to a system user, such as (without limitation) a software/application developer, a system administrator, a database administrator, an information technology professional, a program manager, product manager, etc. The term "user" may further refer to an end-user, an application user, etc., such as (without limitation) one or more of customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
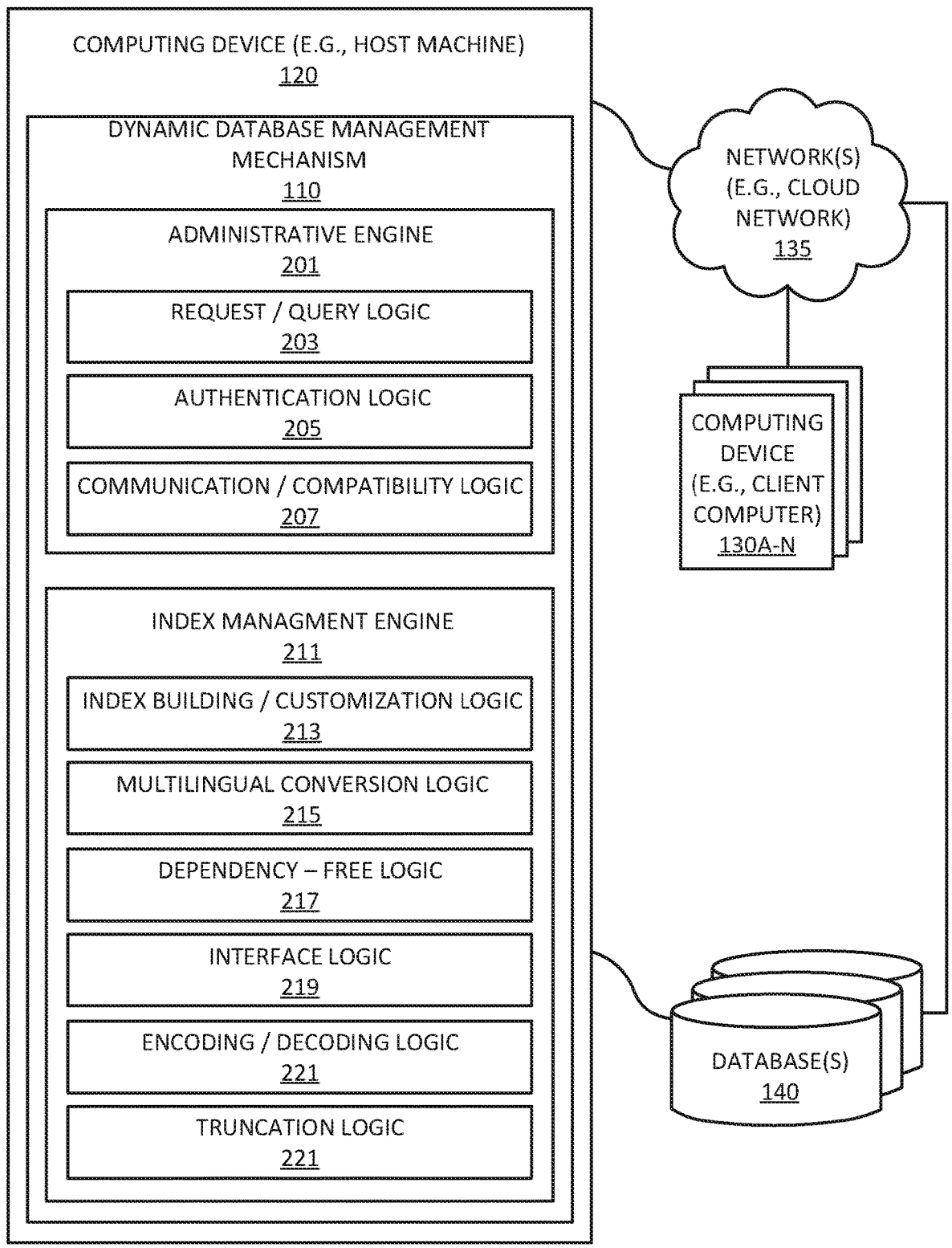
FIG. 2 illustrates a dynamic database management mechanism according to one embodiment.

FIG. 2 illustrates a dynamic database management mechanism 110 according to one embodiment. In one embodiment, database mechanism 110 may include any number and type of components, such as administration engine 201 having (without limitation): request/query logic 203; authentication logic 205; and communication/compatibility logic 207. Similarly, database mechanism 110 may further include index management engine 211 including (without limitation): index building/customization logic 213; multilingual conversion logic 215; dependency-free logic 217; interface logic 219; encoding/decoding logic 221; and truncation logic 223.

In one embodiment, computing device 120 may serve as a service provider core (e.g., Salesforce.com® core) for hosting and maintaining database mechanism 110 and be in communication with one or more database(s) 140, one or more client computer(s) 130A-N, over one or more network(s) 135 (e.g., cloud network), and/or the like.

Throughout this document, terms like "framework", "mechanism", "engine", "logic", "component", "module", "tool", and "builder" may be referenced interchangeably and include, by way of example, software, hardware, and/or any combination of software and hardware, such as firmware. Further, any use of a particular brand, word, or term, such as "data management", "database tables", "indexes", "multi-column indexes", "data definition language", "DDL", "locales", "datatype", "generic", "common", "mapping", "creating", "customizing", "encoding", "decoding", "displaying", "viewing", "receiving", "truncating", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of one or more client devices 130A-N, code execution requests, and so forth.

In one embodiment, computing device 120 may implement request/query logic 203 to serve as a request/query interface via a web server or as a stand-alone interface to receive requests packets or other requests from the client devices 130A-N. The request interface may further support the return of response packets or other replies and responses in an outgoing direction from computing device 120 to one or more client devices 130A-N.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client devices 130A-N.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 130A-N, over one or more networks, such as network(s) 140.

In one embodiment, as illustrated, database mechanism 110 further includes index management engine 211 to allow for a novel technique for dynamic database management including dynamic generation, customization, and maintenance of database indexes, multilingual conversion, etc. For example, in some embodiments, database tables, queries, jobs, etc., may be received or detected by request/query logic 203, which may then be further processed, where such tables, queries, jobs, other sets of information, etc., may placed by and received from a user, associated with a tenant, over one or more network(s) 135.

Conventionally, frequently run reports particularly benefit from multi-column indexes, where these are relatively expensive to construct for tables shared by tenants that have columns with multiple datatypes in the same physical column. One such conventional technique includes building and employing skinny tables, which require that a skinny table be built for each index, per object per organization. This technique requires a great number of skinny tables to match the requested multi-column indexes, where the number of skinny table indexes that a database can build and maintain has practical and design constraints. In addition to other complexities, index data structures can consume a large portion of a database's total memory, where tuples can be relatively small and tables can have many indexes. It is contemplated that freeing up that memory can lead to many benefits, such as achieving lower costs, enhancing the ability to store additional data; however, simply getting rid of all or part of the indexes is suboptimal because indexes improve query performance.

Embodiments provide for a novel technique to provide for an N-Column table that includes A+B columns, where the A columns may be of any datatype supported by one or more database(s) 140 and stored in them might be any relevant metadata associated with the B columns. For example, these B columns may be of the same type, called target type, which respects the relevant comparison rules. Further, this N-Column table may include one or more native database indexes that span all of the A columns (including any metadata) and one or more of the B columns.

For example, a user (such as an administrator, application user, etc.), representing a tenant, may identify application fields (also referred to as "custom fields" or simply "fields") on a computing device, such as one or more of computing device(s) 130A-N, using an interface (such as a user interface (e.g., Web browser, Graphical User Interface (GUI), software application-based interface, etc.), application programming interface (API), Representational State Transfer (REST) or RESTful API, and/or the like) as provided by the one or more of computing(s) 130A-N and facilitated by interface logic 219. It is contemplated that these application fields are to be indexed in any of their renderings using a single interface or a combination of the aforementioned interfaces.

Upon identifying the fields, the user may then specify and then submit a specific order of these fields through the interface, where the order may then be detected and received through request/query logic 203 and forwarded on to index management engine 211. In one embodiment, at index management engine 211, index building/customization logic 213 may be used to map the application fields identified by the user to a corresponding database table and columns such that the fields and their specified order is preserved. For example, if a field maps to more than one column, then that information is included with the order that is preserved using the aforementioned technique.

In one embodiment, index building/customization logic 213 may be further used to create an ordered list of these columns, where each column is annotated with additional attributes that are known about the column. Such attributes may include information like the column's general datatype (e.g., alpha, numeric, etc.) and the range that the column is capable of covering (e.g., from −100.10 to 200.2222, etc.), and/or the like.

Further, in one embodiment, index management engine 211 may be used to maintain a library of functions that index building/customization logic 213 may reference in order to translate these functions to and from various datatypes to correspond to their target binary data types. For example, index building/customization logic 213 may scan the library of functions for each column in the ordered list of application fields to identify a pair of functions (such as an encode function and a decode function) that matches most closely (representing the most optimum match) by satisfying the annotated attributes of that column and then attaches the pair to the list of attributes for that and each of the other columns in the above-referenced ordering list.

In one embodiment, upon successfully completing the aforementioned processes, index building/customization logic 213 may then generate one or more metadata tables having metadata serving as a metadata reference that may or may not be persistent to identify one or more of the following: 1) an original column order; 2) original datatypes; 3) the encoder function (from the pair above); 4) the decoder function (from the pair above); 5) a number of columns; and 6) one or more tenants for which the indexes are being created.

Continuing with the example, in one embodiment, index building/customization logic 213 now intercepts each of the write calls that result in changes to any of these columns. For example, for each column, index building/customization logic 213 may look up its associated metadata to identify the corresponding encoder function and then facilitates encoding/decoding logic 221 to encode a value to the column's target binary type, where encoding/decoding logic 221 may also optionally capture a physical location of where the data is stored (e.g., data block address, pointer to a relevant data row, etc.) and a primary key associated with a data row. This provides for index building/customization logic 213, and thus index management engine 211, to have a binary representation of each column.

Further, in one embodiment, index building/customization logic 213 may use a function, such as a logical insert function, to save the metadata in their metadata columns in the aforementioned N-Column table along with storing the encoded column data in a serial order. This data insert in the N-Column table results in an entry in one or more underlying indexes on this N-Column table.

In additional to dealing with the write call, index building/customization logic 213 is also configured to handle any reads from this index such that it looks for any filtered fields in the incoming data requests and maps those fields to a corresponding database table and columns preserving the ordering or the ordered list, where if a field maps to more than one column then that information relating to both of them is also included in the ordered list that is then preserved.

Further, in one embodiment, index building/customization logic 213 compares contents of the ordered list with contents of a metadata repository to determine any of the filters being satisfied by one or more of their N-Column indexes. If found, encoding/decoding logic 221 may be triggered to encode any filter values to their target binary encoder using the functions specified in the metadata. In one embodiment, index building/customization logic 213 may then use the results of this encoding along with the metadata to generate metadata values for metadata columns and then queries one or more of the indexes underlying the N-Column table.

This information may be used by encoding/decoding logic 221 to look up a primary key (or a physical row address) if the query cannot be satisfied by only the index. Further, if part of the data is used by the index, then as facilitated by encoding/decoding logic 221, this may invoke a decoder function at the generated SQL level to convert the binary type into its original type or invoke it later while iterating the generate results set. The user may only see identical functional results whether or not this table and the index (table+index) are present. Further, for example, encoding/decoding logic 221 may be used to encode data taking advantage of data specifics to significantly reduce or cut down on the usage of one or more of system components, such as memory, central processing unit, storage, etc.

With regard to exponential explosion effect, it is contemplated that multi-column indexes are built over indexable tables with intrinsic datatypes that are pre-assigned to physical table columns, as required for indexing. If only a few multi-column indexes are provided, multi-column indexing can be manageable, but when tenant organizations are given the option of custom indexes over multiple custom fields in the shared table, index proliferation becomes a serious problem, such as resulting in exponential explosion in the number of indexable tables and indexes in order to support a multi-column indexing over N intrinsic datatypes in an M column multi-column index is represented as: N exp M or $N^M$.

As will be further described with reference to FIG. 8, even with just three intrinsic datatypes and a three-column index, $3^3=27$ separate indexable tables with different physical columns for different orderings or permutations (with replacement) of intrinsic datatypes can be required. Similarly, for a four-column index of just three datatypes, $3^4=81$ separate physical tables can be needed, and so forth.

In one embodiment, index management engine 211 further provides for language compatibility, such as multilingual conversion, sorting, etc., as necessitated, using multilingual conversion logic 215. For example, using multilingual conversion logic 215, a sort key may be additionally generated and stored in one of the N-Columns encoded as a target binary type as facilitated by encoding/decoding logic 221, where this may be recoded in the metadata that is created and used in queries that may require sorting in different languages.

As aforementioned, certain character-based languages, such as Japanese, Chinese, Korean, etc., may be encoded, by encoding/decoding logic 221, in a pattern that preserves a linguistically proper ordering of character combinations, while encoding of data applies across languages and data types. Further, in one embodiment, encoding/decoding logic 221 may offer certain encoding functions that are capable of encoding custom fields from multiple languages (e.g., Chinese, English, German, Japanese, etc.) into the generic-indexable datatypes and thus, multi-column indexable tables may be created for multiple languages so that multi-column indexes can index multilingual data from the underlying shared tables.

Continuing with discussion of index management engine 211, it further provides dependency-free logic 217 to allow for automatic and dynamic generation indexes without being subject to or rely on any particular standards or protocols associated with structures relating to databases. For example, data definition language ("DDL" or "ddl") is regarded as a standard for commands that define various structures in a database, where DDL statements are used to create (such as using statement CREATE), modify (such as using statement ALTER), and delete (such as using statement DROP) various database objects, such as indexes, tables, users, etc.

It is contemplated that DDL is regarded as a syntax that is in ways similar to a computer programming language for defining data structures, such as database schemas. In one embodiment, as facilitated by dependency free logic 217, once the N-Columns (table+indexes) have been created, creation of new indexes (DDL) or tables (DDL) may not be required for any number of columns that are to be indexed, where, for example, as long as the number of columns is less than B (e.g., N=A+B). For example, in applying to a table (whether multitenant-based or otherwise), this technique, through dependency-free logic 217, allows for DDL-free creation of indexes, on demand, which may be populated by any number of ways, such as triggers, as domain indexes, asynchronous jobs, etc. Further, dependency-free logic 217 allows for N-Columns to be indexed and additionally, allows for indexes on any number and type of properties.

As discussed throughout this document, an N-Column may include an $M_{indexed\_metadata\_columns} + N_{indexed\_data\_columns} + P_{payload\_columns\_not\_indexed}$ column table having an index on the M+N columns, where N columns are of the common encoded type, while M are metadata columns, where $C1_{type\_date}$, $C2_{type\_string}$, $C3_{type\_string}$, and $C4_{type\_string}$ can map to $R4_{type\_raw}$, $R1_{type\_raw}$, $R3_{type\_raw}$, and $R4_{type\_raw}$, respectively, such as C1→R4, C2→R1, C3→R3, C4→R2. Further, for lookups on the base table (such as upon which the index is built), these indexes are capable of storing references to either the primary key or to one or more block addresses of the one or more data rows, again stored as one of the N-Columns. In addition to just the data, these indexes may be used to store additional properties of data obtained by invoking any function on this data and storing that in one of the N-Columns (such as composite column hashes on one or more columns from the base table, fast bloom like structure against one or more columns from the base table). Further, all the properties of the indexes (such as order, columns, various functions used, etc.) are fully described by index metadata and stored in a separate table from the indexes. Further, in one embodiment, one or more of these properties may be used to speed up any queries issued against the base table.

In some embodiments, dependency-free logic 217 may be used along with other components of index management logic 211 to facilitate automatic creation of multi-column indexes based on, for example, multi-column search queries issued by users, including queries that are part of report generation. For example, any sort keys specified by a user in a query may be used to automatically create new indexes for the multi-column indexable table, where a check may be executed at query-time to determine whether the indexable table has an existing index that matches the queried sort criteria. If a matching index is not found, then index building/customization logic 213 may be used to build new indexes for the indexable table at run time that match the queried sort criteria. Once created, the new indexes may be used to respond to subsequent queries. If a tenant repeatedly uses certain multi-column sort keys, then index building/customization logic 213 may be used to automatically create and maintain new indexes, such as using the indexable table. Further, for example, any repeated use is determined by a threshold count of queries issued by the tenant that use the same multi-column sort keys over a time period.

As mentioned above, this novel technique for multi-column, custom index may be further enhanced using truncated versions of data fields for keeping large sections of indexes cached in memory for quick response, as facilitated by truncation logic 223 of index management engine 211. For example, caching whole indexes in memory can offset additional costs of retrieving records based on truncated versions of data fields, followed by filtering out of rows retrieved that are not actually responsive to a query or needed for a report.

On demand reports show a limited amount of data, typically beginning with display of a first page of results while additional result pages are compiled. This favors an index structure that is compact enough to retain in memory, so that a first page of results is more quickly assembled. In some embodiments, using truncation logic 223, custom fields encoded to the generic-indexable datatypes may be truncated before being stored in the indexable table, where this truncation may include dropping least significant data from the encoded custom fields, as necessitated, to fit a fixed width indexable column of the indexable table.

Further, in some embodiments, multi-column indexable table may produce false matches due to potential collision between two or more truncated encodings of custom fields. A potential collision may occur when two or more identical truncated encodings in the indexable table back reference to different records in the shared table. To overcome this issue, in one embodiment, the underlying shared table may be automatically accessed to fetch the corresponding completed records of the colliding truncated encodings and eliminate the false matches, where such false matches are eliminated through evaluation of the queried criteria against the fetched complete records, while discarding those records that do not meet the criteria as facilitated by truncation logic 223.

As referenced throughout this document, it is contemplated and to be noted that database(s) 140 may include any number and type of local and/or remote databases and/or datasets, such as multi-column indexes, multi-column indexable tables, intermediate results, multi-tenant shared tables, results sets, multiple intrinsic datatypes, and/or the like.

It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like.

Referring back to database mechanism 110, multi-column indexes may be generated, where any relevant data associated with multiple organizations, tenants, clients, and/or customers may be used to inhabit multi-tenant shared tables at one or more database(s) 140. It is contemplated that shared tables include custom objects and custom fields with multiple intrinsic datatypes with different custom fields used by different tenant customers. For example, based on the custom field columns identified by the tenant, encoding/decoding logic 221 may be used to encode their multiple intrinsic datatypes into a generic-indexable datatype, while preserving the sort ordering of the datatypes in custom field columns.

In one embodiment, index building/customization logic 213 may be used to copy the encoded custom fields in a multi-column indexable table, where the multi-column indexable table includes multiple indexable columns. Examples of column counts in multi-column indexes are two, three, four or five columns, and so forth. In one embodiment, a user (e.g., database administrator) using an interface (e.g., indexing interface, user interface, API, etc.) may issue a command for creating the multi-column indexable table, where, in such a case, one or more functionalities of index building/customization logic 213 are triggered in response to the user's command. In another embodiment, users can request generation of a multi-column index. In yet another embodiment, one or more sensors may sense patterns of usage and determine that a multi-column index is automatically prepared without a request from the user. Further, index building/customization logic 213 builds a multi-column index over the multi-column indexable table, where the multi-column index is a sorted index that maintains the preserved sort ordering of the indexable table that can be sequentially traversed. Examples of sequentially traversable multi-column indexes include B-trees and R-trees.

Further, in one embodiment, request/query logic 203 uses a sorted multi-column index to respond to queries issued by users on behalf of their tenants using one or more interfaces. In some embodiments, request/query logic 203 receives queries, where query search terms of such queries are encoded by encoding/decoding logic 221 into generic-indexable datatypes for queries against a client-partition of the multi-column index, where request/query logic 203 may access some index entries within the client-partition of the multi-column index to return certain sequences of results consistent with the sort ordering specified in the indexable table.

Communication/compatibility logic 207 may facilitate the ability to dynamically communicate and stay configured with any number and type of software and/or hardware developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from database mechanism 110 to facilitate various embodiments including adding, removing, and/or enhancing certain features. It is contemplated that embodiments are not limited to any particular technology, topology, system, architecture, and/or standard and are dynamic enough to adopt and adapt to any future changes.

Figure 3:
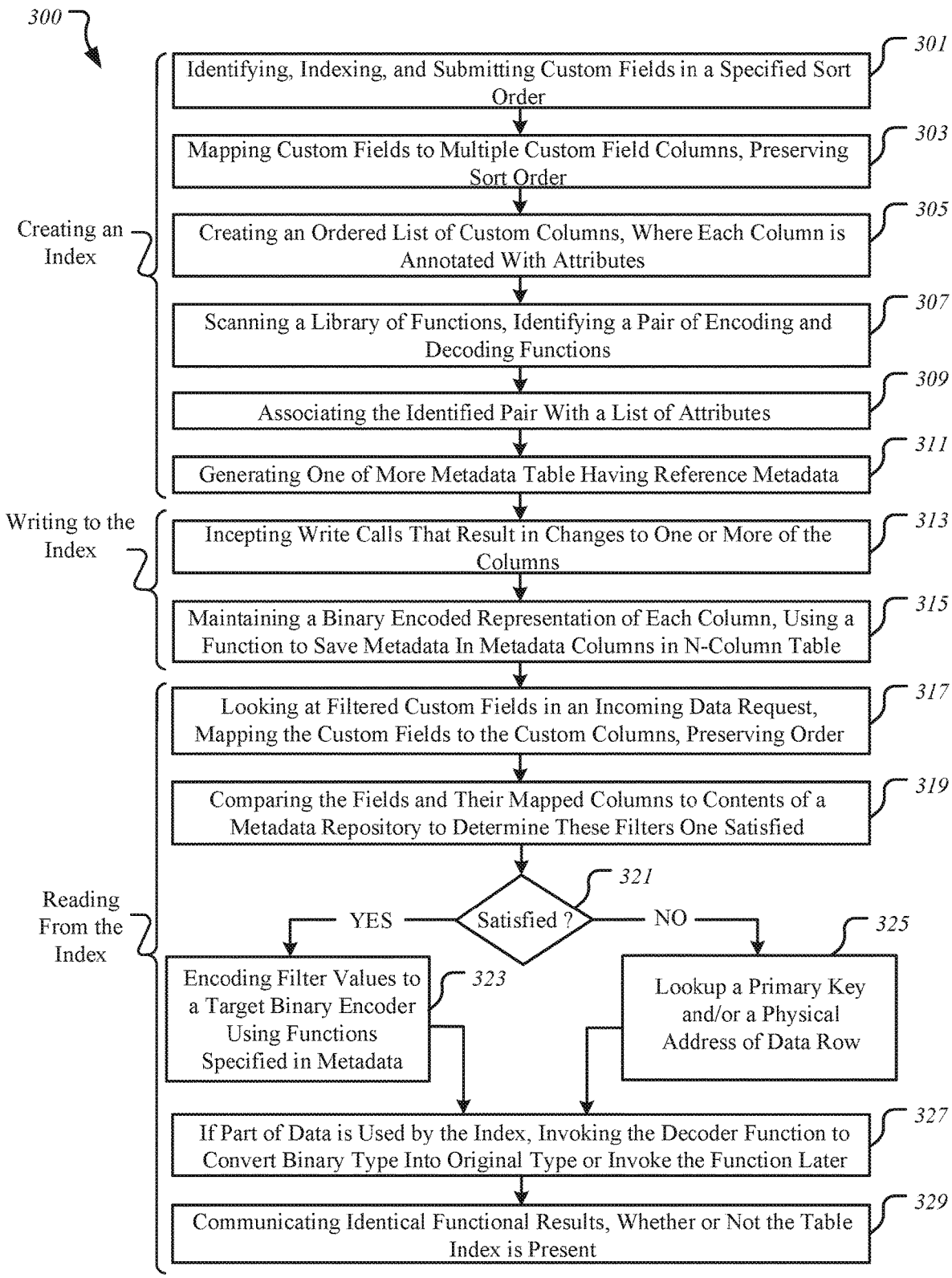
FIG. 3 illustrates a method for facilitating dynamic creation and maintenance of multi-column custom indexes according to one embodiment.

FIG. 3 illustrates a method 300 for facilitating dynamic creation and maintenance of multi-column custom indexes according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed or facilitated by one or more components of database mechanism 110 of FIGS. 1-2. The processes of method 300 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Method 300 begins at block 301 with generation of an index by identifying of application fields and indexing of such application fields in any of their renderings using one or more interfaces at a computing device. As aforementioned with respect to FIG. 2, the ordering of the custom/applications fields may be specified by a user, where this ordering is submitted to database mechanism 110. At block 303, the application fields are mapped to a corresponding database table and multiple custom field columns, preserving the ordering. At block 305, an ordered list of these columns is created, where each column is now annotated with additional attributes that are known about the column.

At block 307, in one embodiment, scanning a library of functions to translate any data types associated with each column in the ordered list to and from their target binary datatypes to identify pairs (encode, decode) that match, most closely, by satisfying the annotated attributes associated with each column, where, at block 309, each identified pair is associated with the list of attributes of each column from the list. At block 311, one or more metadata tables having reference metadata that may or may not be persistent to identify or reference one or more of the following: 1) the original column order; 2) the original data types; 3) an encoder function (from the identified pair); 4) a decoder function; 5) a number of columns; and 6) a tenant (e.g., organization, entity, etc.) for which the index is generated.

Method 300 may then continue at block 313 with writing to the generate index by incepting each of the write calls that result in changes to any of these columns from the list. For example, for each column, its corresponding metadata is looked up to identify a corresponding encoder function such that a value is encoded to its target binary type. Further, optionally, it may also capture a physical location (e.g., data block address, pointer to data row, etc.) of where the data is stored along with a primary key associated with a data row corresponding to the physical location.

Further, in one embodiment, at block 315, a binary encoded representation of each column is maintained, where a logical insert function is used to save the metadata in metadata columns in an N-Column table and following it, any column data is encoded in a serial order. This data insertion in the N-Column table results in an entry in one or more underlying indexes on this N-Column table.

Method 300 may then continue at block 317 with reading from the generated index by detecting filtered fields in an incoming data request and mapping the fields to a corresponding database table and columns, preserving the order, where if a filed maps to one or more columns, all mapped columns are then included in the preserved order. At block 319, compare the fields and their mapped columns to contents of a metadata repository to determine whether these filters can be satisfied by one or more N-Column indexes that it contains.

At block 321, a determination is made to as whether the filters are satisfied or not. If satisfied, at block 323, any filtered values are encoded on to the target binary encoder using the functions specified in the metadata and using it along with the metadata to generate metadata values for metadata columns and further, queries one or more of the indexes underlying the N-Column table.

If not satisfied, at block 325, this information may be used to look up the primary key (and/or the physical address of the data row) if the query is not satisfied by the index only. If part of the data is used by the index, at block 327, a decoder function may be invoked at the generated SQL level to convert the binary type into its original type or invoke it later while iterating the generated result set. At block 329, identical functional results are offered to a user having access to a computing device, where the user can view these identification functional results, whether or not this table and index is present, using a display device coupled to the computing device.

Figure 4A:
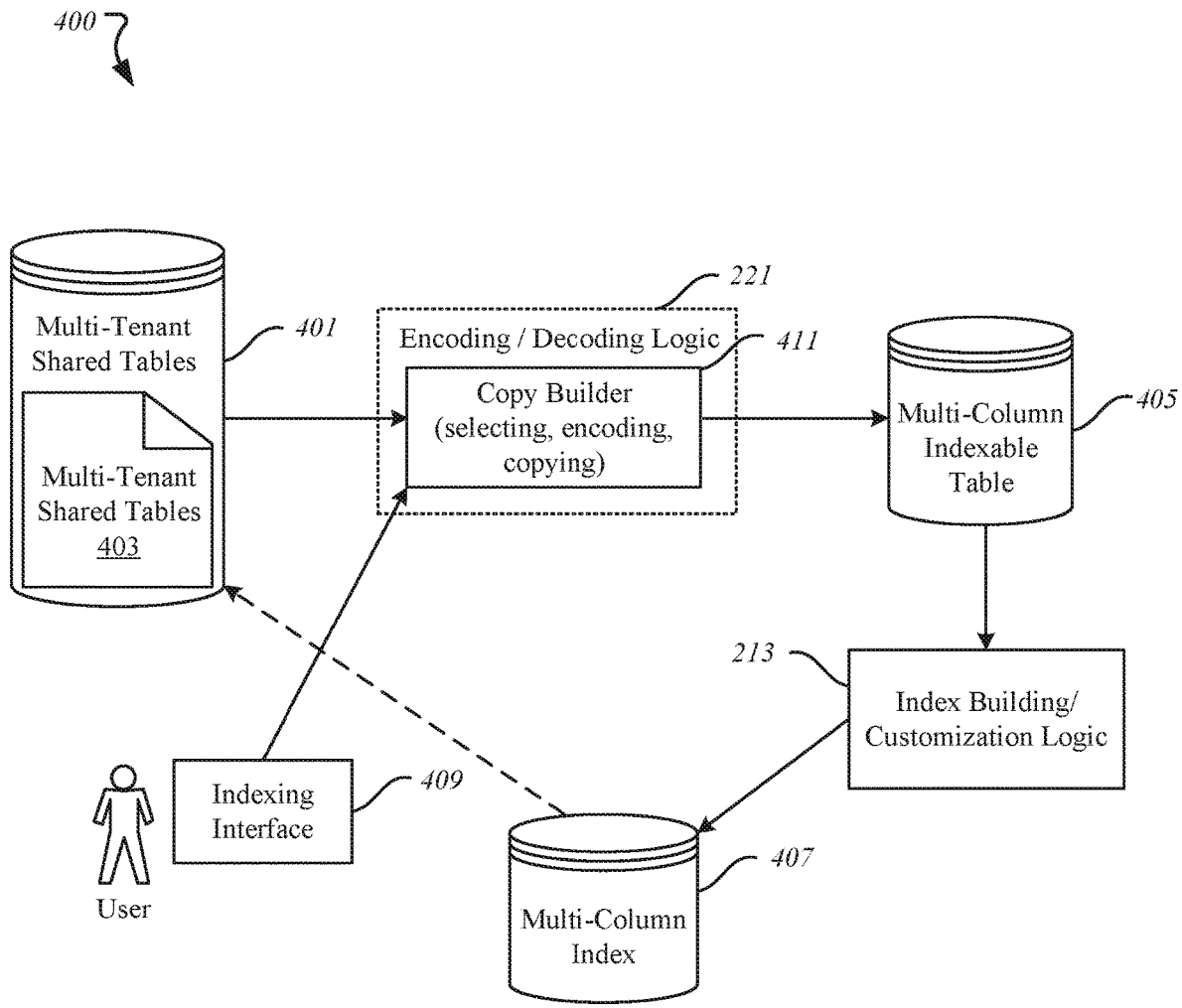
FIG. 4A illustrates a transaction sequence for facilitating dynamic creation and maintenance of multi-column custom indexes according to one embodiment.

FIG. 4A illustrates a transaction sequence 400 for facilitating dynamic creation and maintenance of multi-column custom indexes according to one embodiment. Transaction sequence 400 may be performed by processing logic that may comprise hardware (e.g., circuitry, dedicated logic, programmable logic, etc.), software (such as instructions run on a processing device), or a combination thereof. In one embodiment, transaction sequence 400 may be performed or facilitated by one or more components of database mechanism 110 of FIGS. 1-2. The processes of transaction sequence 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Transaction sequence 400 provides for a sequence of data flow during building of a series of multi-column indexes. In one embodiment, a user (e.g., database administrator, end-user, etc.) issues a command using interface 409 (e.g., indexing interface, such as a web browser) at a computing device to create one or more multi-column indexes on certain custom field columns of multi-tenant shared tables 401. In response to the user's command, copy builder 411 (e.g., selecting, encoding, copying), being part of or associated with encoding/decoding logic 221, may serve to select identified custom field columns and encode their custom fields to generic-indexable datatypes, while preserving the sort ordering of the original data in the custom fields, as discussed above. In another embodiment, a system-initiated action, as opposed to the user's command, may lead to an index building sequence as facilitated by index building/customization logic 213 of index management engine 211 of FIG. 2.

Further, for example, copy builder 411 may copy the encoded custom fields into multi-column indexable table 405, wherein index building/customization logic 213 may then build multi-column index 407 over multi-column indexable table 405, while maintaining the sort ordering of multi-column indexable table 405, where a resulting index, such as multi-column index 407, may be used to index data from multi-tenant shared tables 401 having multi-type objects 403.

Figure 4B:
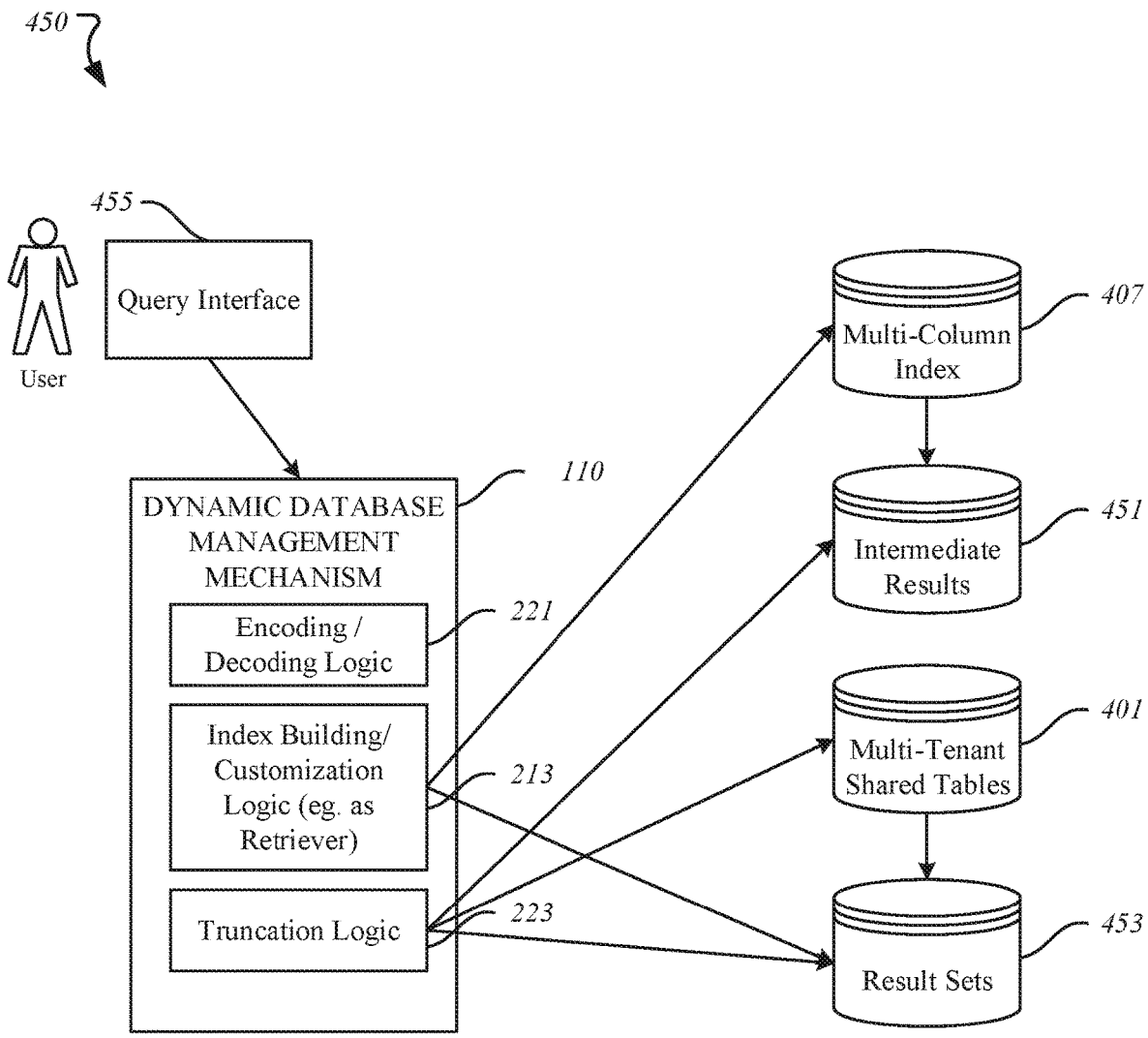
FIG. 4B illustrates a transaction sequence for facilitating dynamic creation and maintenance of multi-column custom indexes according to one embodiment.

FIG. 4B illustrates a transaction sequence 450 for facilitating dynamic creation and maintenance of multi-column custom indexes according to one embodiment. Transaction sequence 450 may be performed by processing logic that may comprise hardware (e.g., circuitry, dedicated logic, programmable logic, etc.), software (such as instructions run on a processing device), or a combination thereof. In one embodiment, transaction sequence 450 may be performed or facilitated by one or more components of database mechanism 110 of FIGS. 1-2. The processes of transaction sequence 450 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-2 may not be repeated or discussed hereafter.

Transaction sequence 450 provides for a sequence of data flow during a query of multi-column indexes according to one embodiment. In one embodiment, user (e.g., database administrator, end-user, etc.) issues a multi-column query for a particular tenant (e.g., organization, entity) using interface 455 (e.g., query interface, such as a web browser) at a computing device. This query may then be processed by one or more components of database mechanism 110 by first converting any query search terms of the query into a generic-indexable datatype using, for example, encoding/decoding logic 221. For example, as illustrated with reference to FIG. 8, encoding/decoding logic 221 may use different functions F(Type) that encode any of the intrinsic datatypes of query search terms into a form that can be applied using the generic-indexable datatype. For example, database mechanism 110 may use index building/customization logic 213 as a retriever to sequentially access index entries of sorted multi-column index 407 and return sequences of result sets 453 based primarily on the sort order specified in multi-column indexable table 405 of FIG. 4A.

As described with reference to FIG. 2, embodiments further provide for enhancing this novel technique for multi-column, custom index by using truncated version of data fields to facilitate maintaining large sections of indexes cached in memory for quick responses as facilitated by truncation logic 223.

For example, in some embodiments, a multi-column indexable table, such as multi-column indexable table 405 of FIG. 4A, may produce false matches due to potential collision between two or more truncated encodings of custom fields. A potential collision may occur when two or more identical truncated encodings in the indexable table back reference to different records in a shared table of multi-tenant shared tables 401. To overcome this issue, in one embodiment, the underlying shared table may be automatically accessed to fetch the corresponding completed records of the colliding truncated encodings and eliminate the false matches, where such false matches are eliminated through evaluation of the queried criteria against the fetched complete records, while discarding those records that do not meet the criteria as facilitated by truncation logic 223.

Consider, for example, two strings "John Smith Sr." and "John Smith Jr." Now consider that encoding converts the two strings into the following respective binary values: "101 102 01" and "101 102 02". Further, consider that the applicable truncation scheme retains in the multi-column indexable table only the first several characters, such as the first 6 characters, of an encoding, while the last 2 characters are trimmed from each of the binary values, and thus, in this example, the binary values that are stored in the indexable table are likely to be identical truncated encodings, such as "101 102" and "101 102".

Continuing the above example, in response to a query for "John Smith Sr.", the indexable table may use two truncated encodings "101 102" and "101 102" to look up the underlying shared table in multi-tenant shared tables 401 because both the encodings correspond to t "John Smith" as being part of the queried string. As a result, initially, the indexable table returns strings "John Smith Sr." and "John Smith Jr." from the shared table, where these initial results are stored in an intermediate results database 451 of database(s) 140 of FIG. 2. However, using truncation logic 223, the false hit of "John Smith Jr." may then be removed from the initial results at intermediate results database 451 for failing to match the queried string of "John Smith Sr.", where these filtered results are then stored as final results in results sets database 153 of database(s) 140 of FIG. 2.

Figure 4C:
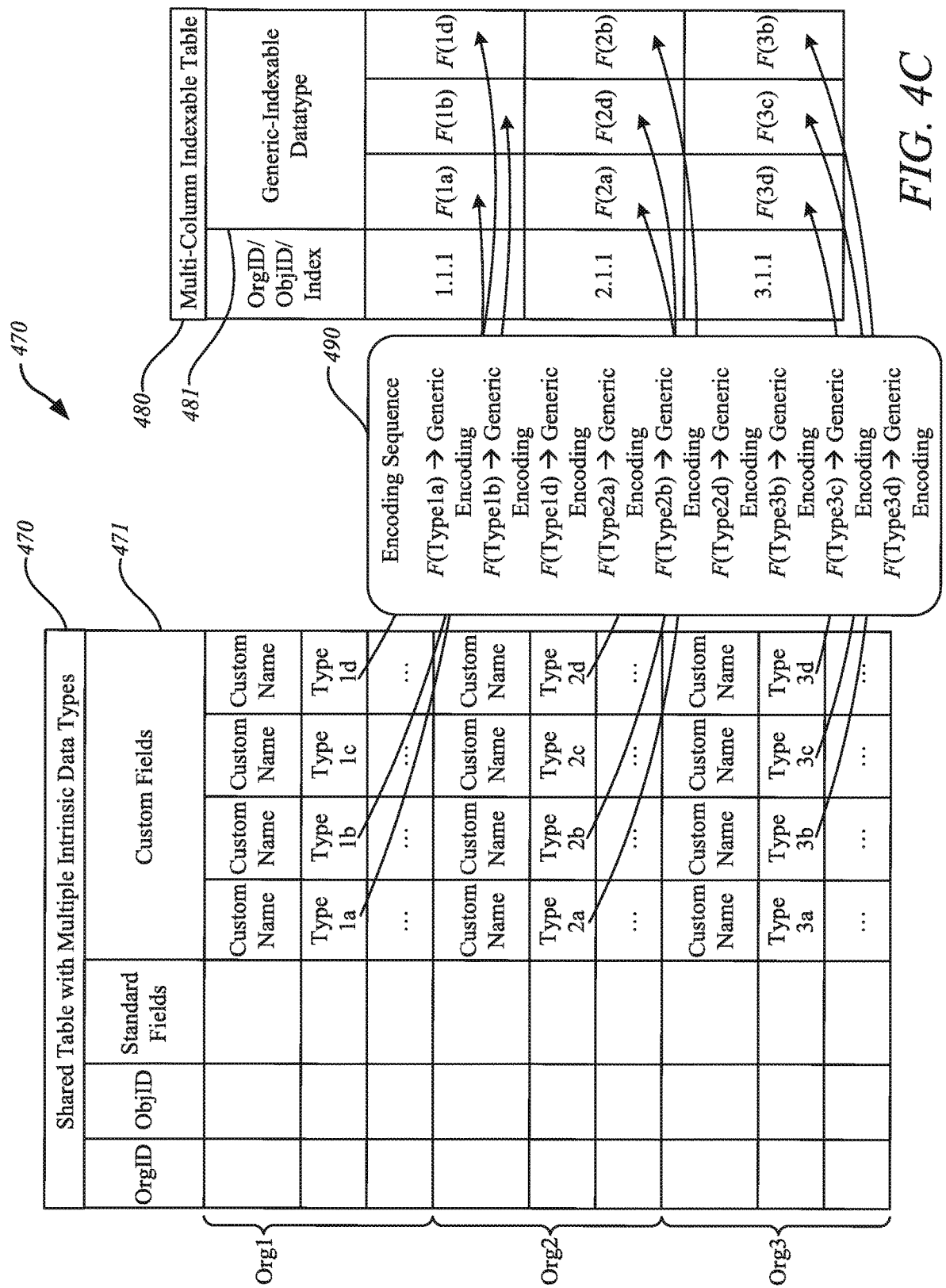
FIG. 4C illustrates a transaction sequence for facilitating dynamic creation and maintenance of multi-column custom indexes according to one embodiment.

FIG. 4C illustrates a transaction sequence 470 including an encoding sequence 490 for processing custom fields 471 selected by a tenant customer from an original shared table 470 with multiple intrinsic datatypes for inclusion into an generic-indexable datatype 481 of multi-column indexable table 480 according to one embodiment. As illustrated, shared table 470 includes at least an OrgID that distinguishes among tenant customers, such as Org1, Org2, and Org3, where this shared table 470 can be horizontally portioned between standard fields and custom fields 471, with appropriate keys or pointers to link tables used to implement the horizontal partitioning. This horizontal partitioning and linking are further illustrated and explained in Weissman as referenced in FIG. 7.

In the illustrated shared table 470, each tenant or organization may use any of custom fields 471 as they chose, with a subschema for their use of custom fields 471. For illustration purposes and brevity, a single row is shown for and assigned to each tenant for a custom field name or simply "custom name" as referenced here. A custom name used by a tenant, such as by a user associated with the tenant, may be implemented as metadata in a subschema stored separately from shared table 470. Further, custom names are illustrated here to indicate that Org1, Org2 and Org3 are capable of independently determining what data and/or datatypes are to be stored in the shared physical columns of custom fields 471.

It is contemplated that part of choosing how to use custom fields 470 is choosing what intrinsic datatypes to store in each of custom fields 470, such as Org1 may chose "string" as the datatype for a field named "JobShareLastName" in a first of custom field 471 and as a result, Type 1a may correspond to the intrinsic datatype "string". Similarly, Org2 is free to choose "date" as the datatype for a field named "TargetFaceToFaceDate", which corresponds to Type 2a as illustrated here. Now suppose that Org3 choses "number" as Type 3a, which, in turn, leads to all three different intrinsic datatypes being used in the first physical column among custom fields 471 in shared table 470.

For example, three requests by three tenants for three column indexes are illustrated, where Org1 has chosen a custom multi-column index that uses columns 1, 2 and 4, with datatypes 1a, 1b and 1d, in that sort order, Org2 has chosen a custom multi-column index with columns 1, 4 and 2, while Org3 is requesting an index that uses datatypes 3d, 3c and 3b. Since these three tenants use different intrinsic datatypes in their custom fields, using conventional techniques, it would not be feasible to copy their custom fields 471 into a single indexable table with the copied data in the desired sort order for indexing. For example, copying into a single indexable table would violate the constraint that an indexable physical column can hold only one intrinsic datatype.

Embodiments provide for a novel technique for processing the data, including custom fields 471, such as by encoding all of the data to be indexed into generic-indexable datatype 481 that preserves the specified sort ordering of the underlying data. As previously described with reference to FIG. 2, such data processing, including encoding, may be performed by one or more components of index management engine 211, such as encoding/decoding logic 221.

In one embodiment, as illustrated in encoding sequence 490, encoding/decoding logic 221 of FIG. 2 may be used to apply a set of functions F(Type) that encode any of the intrinsic datatypes of custom fields 471 into a form that is capable of being stored and indexed using the generic-indexable datatype 481, where all of types 1a-1d, 2a-2d, and 3a-3d pass through encoding/decoding logic 221 and thus are encoded to generic-indexable datatype 481. Further, for example, encoding/decoding logic 221 may use Base10 encoding for numerical characters, Base26 encoding for letter characters, and/or Base36 encoding for a character sets (letters and numbers). In some embodiments, different encoding schemes may be used, such as Base52 (lower case alpha), Base62 (alpha-numeric), etc., such that any conventional or future-developed string encoding technique can be used. The encoding may be used to normalize characters that appear in words, to improve matching, etc. For instance, for matching purposes, various characters can be converted from upper case or lower case or vice versa, such as "G" matching "g" in an index.

Further, for example, generic-indexable datatype 481 may include any datatype (e.g., number, raw) available in the shared table 470 such that a specified sort ordering of the original data in shared table 470 is preserved. In some embodiments, the specified sort ordering may be natural or determined by a linguistic locale and preserved based on any number and type of encoding rules enforced and used by encoding/decoding logic 221, such as a) if O1=O2, then E1=E2; b) if O1<O2, then E1<=E2; and c) if O1>O2, then E1>=E2, where O represents original type, E represents encoded type, and Function F(O) yields E.

For example, a specified sort order may be a natural sort order as determined by a linguistic locale, such as English, Japanese, etc. Similarly, the specified sort order may be artificially set when one linguistic locale (e.g., German) is translated into another linguistic locale (e.g., English), or when encoding within a linguistic locale is modified (e.g., upper and lower case strings are encoded similarly).

Further, the first, second and third physical columns for copies of encoded fields may hold data translated from any arbitrary intrinsic datatype, where a single multi-column indexable table 480 may be the basis for a large number of multi-column indexes, over diverse intrinsic datatypes, after the diverse intrinsic datatypes are encoded to generic-indexable datatype 481 with preserved sort ordering. In one embodiment, multi-column indexable table 480 may be vertically partitioned by OrgId, where vertical partitioning enables a single sorting, indexing and other physical data manipulation operation to be applied to the multiple tenant organizations that inhabit shared table 470. Sharing of sorting and indexing operations for a large table does not risk logical confusion, because the rows in the requested multi-column indexes are all qualified by requestor, before indexed data columns. In addition to partitioning by OrgId, shared table 470 can be vertically partitioned by index name, number or identifier, within OrgId, to support multiple indexes for a single tenant, where it may also be partitioned by ObjId to support multiple object types that a single tenant stores in their part of shared table 470. These ObjIds, like standard field names, can be standard across multiple tenants to facilitate software reuse, where standard ObjIds can have different custom fields 471 for different tenants. Qualification of the rows in requested multi-column indexes may be requested by requestor, where object and index identifier reduces the number of indexes managed by the underlying database engine, such as database mechanism 110 of FIG. 2.

In one embodiment, multi-column indexable table 480 may hold encoded data that supports generation of one physical index to satisfy an arbitrary number of requests for logical multi-column indexes. As discussed with reference to FIG. 2 and further illustrated with reference to FIG. 8, in case of three intrinsic datatypes in a three-column index, exponential explosion could otherwise require 27 vertically partitioned physical indexes, instead of just one, in 27 physical indexes, vertical partitioning would support an arbitrary number of logical indexes. Due to the one intrinsic datatype per indexed column limitation, there is a potential need for 27 physical indexes over three datatypes in three columns in the absence of encoding the data to generic-indexable datatype 481 and generating multi-column indexes over generic-indexable datatype columns.

Figure 8:
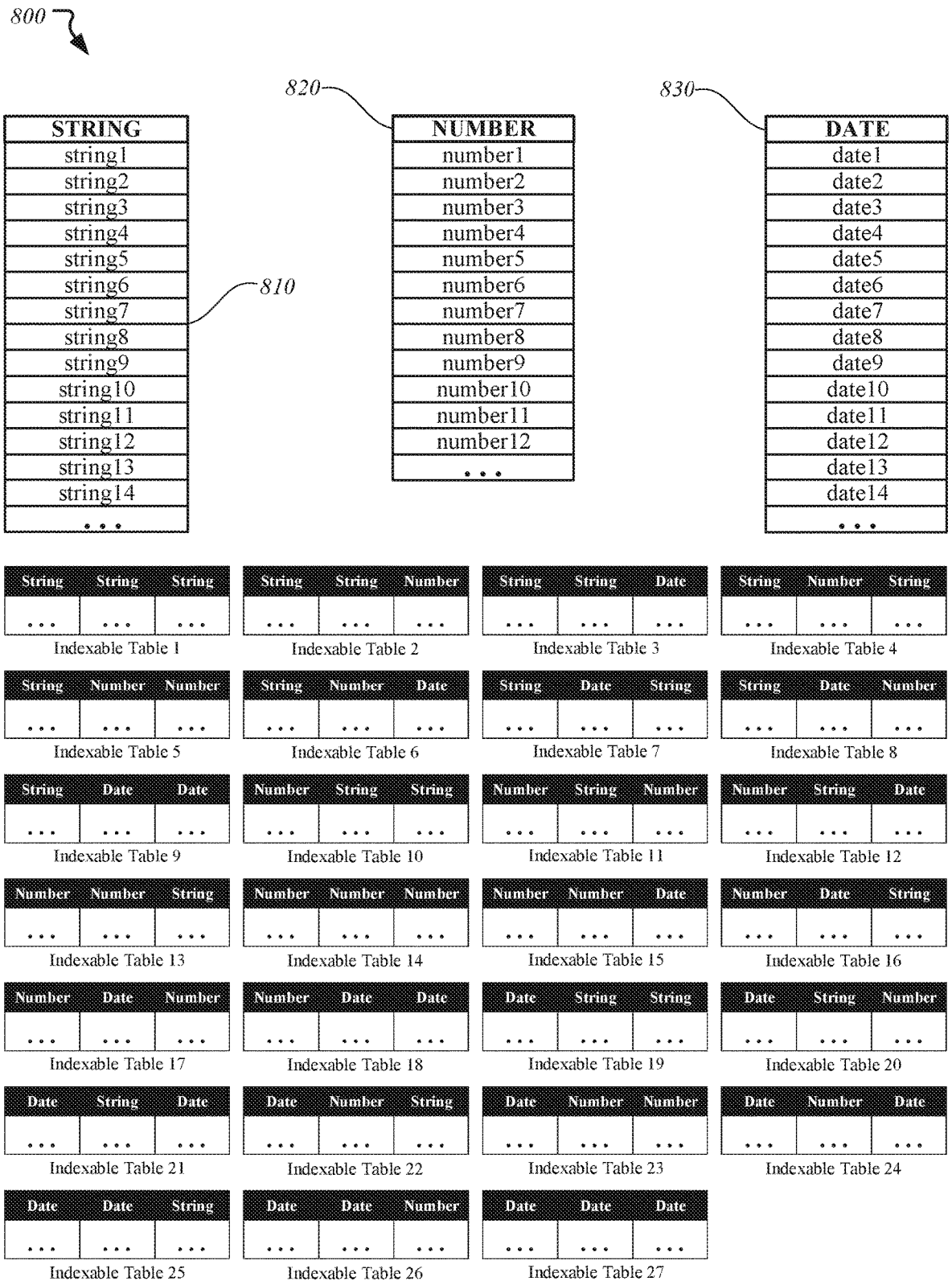
FIG. 8 illustrates a proliferation of separate multi-column indexes that could be required using conventional technology.

Referring now to FIG. 8, it illustrates a proliferation 800 of separate multi-column indexes that could be required using conventional technology, as described above. With three columns and just three intrinsic datatypes, in a table shared by a large number of tenants, requests for custom multi-column indexes can produce an exponential explosion in datatype triple sequences, each of which may necessitate a separate index structure, even with client partition keys. For example, FIG. 8 here depicts columns 810, 820, and 830 that contain dedicated data for each intrinsic datatype (e.g., string, number, date) used in a shared table. FIG. 8 further illustrates 27 separate multi-column indexable tables created over three columns 810, 820, and 830 due to the aforementioned exponential explosion effect. For example, applying the N Exp M or ($N^M$) relationship between N datatypes and M columns, for a three-column index (M=3) indexing columns 810, 820, and 830, for the three intrinsic datatypes strings, numeric values (numbers), and dates (N=3), such as $3^3$=27 separate indexable tables are necessitated to support the following 27 ordering triples of the intrinsic datatypes:

| | | |
|---|---|---|
| string, string, string | string, string, number | string, string, date |
| string, number, string | string, number, number | string, number, date |
| string, date, string | string, date, number | string, date, date |
| number, string, string | number, string, number | number, string, date |
| number, number, string | number, number, number | number, number, date |
| number, date, string | number, date, number | number, date, date |
| date, string, string | date, string, number | date, string, date |
| date, number, string | date, number, number | date, number, date |
| date, date, string | date, date, number | date, date, date |

Each of the above 27 ordered datatype triples are maintained in separate indexable tables, such as "Indexable Table 1" to "Indexable Table27", as illustrated, where database engines supporting more than three intrinsic data types and multi-column indexes can span more than three columns.

Figure 5:
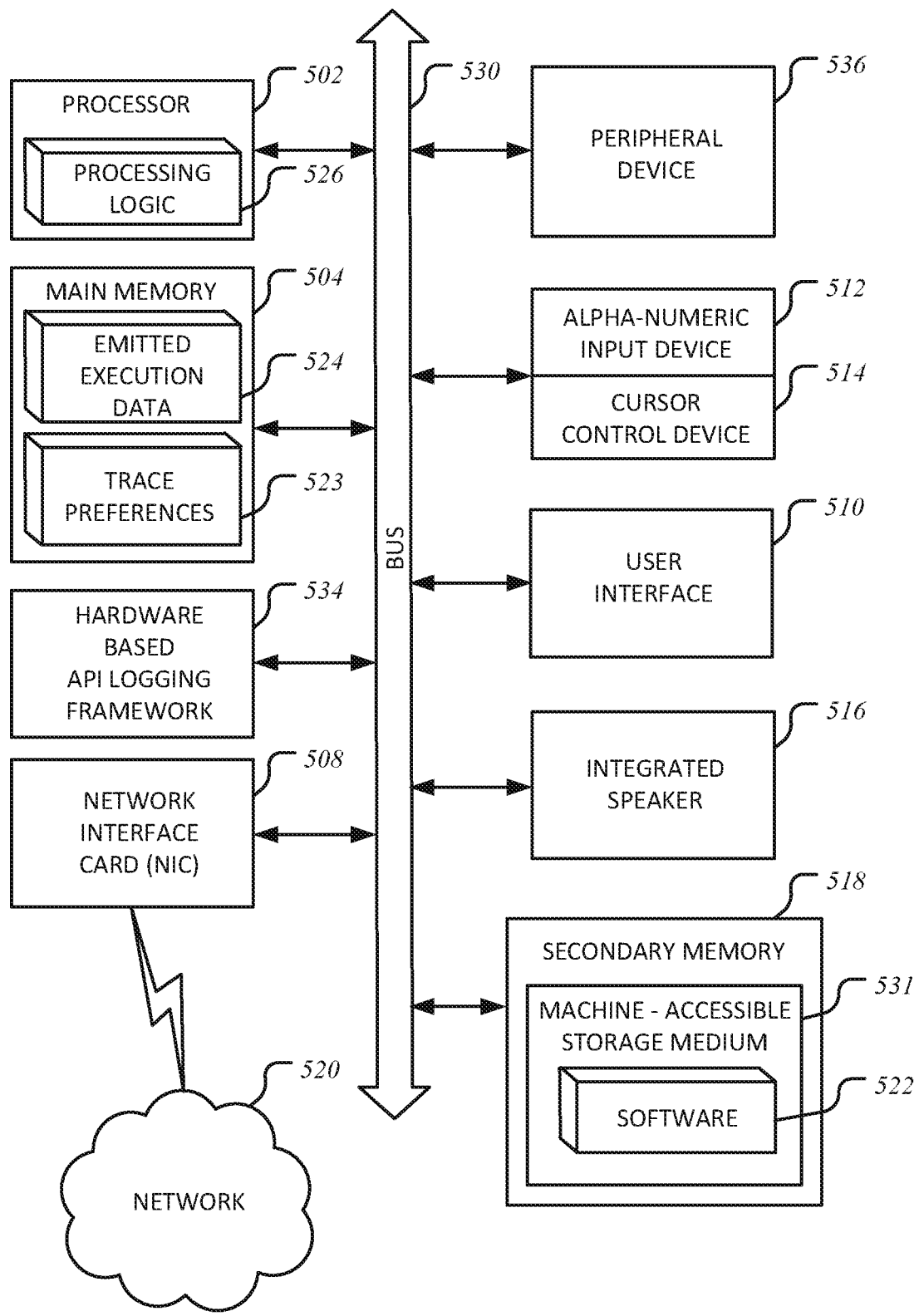
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of control mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of control mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
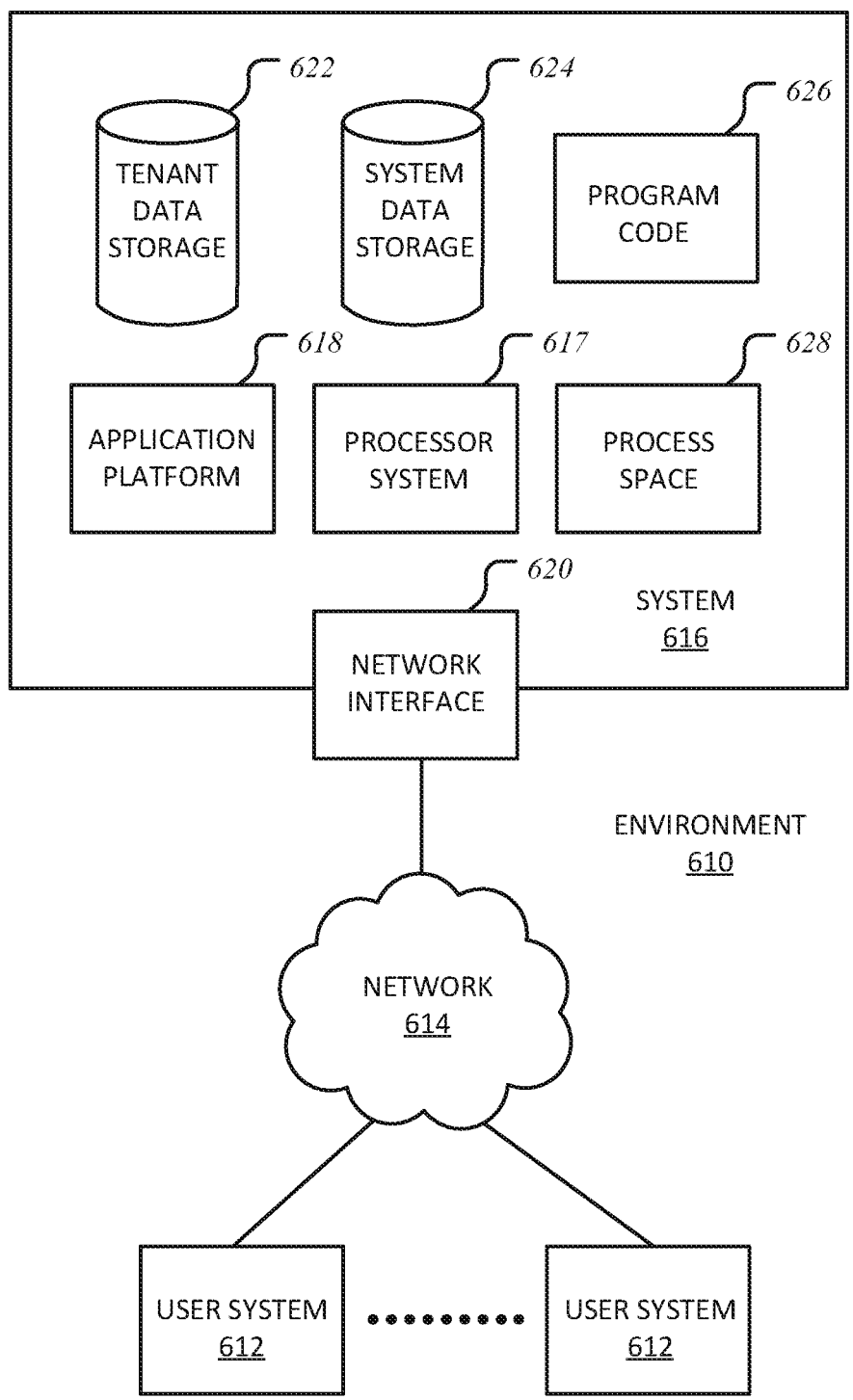
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
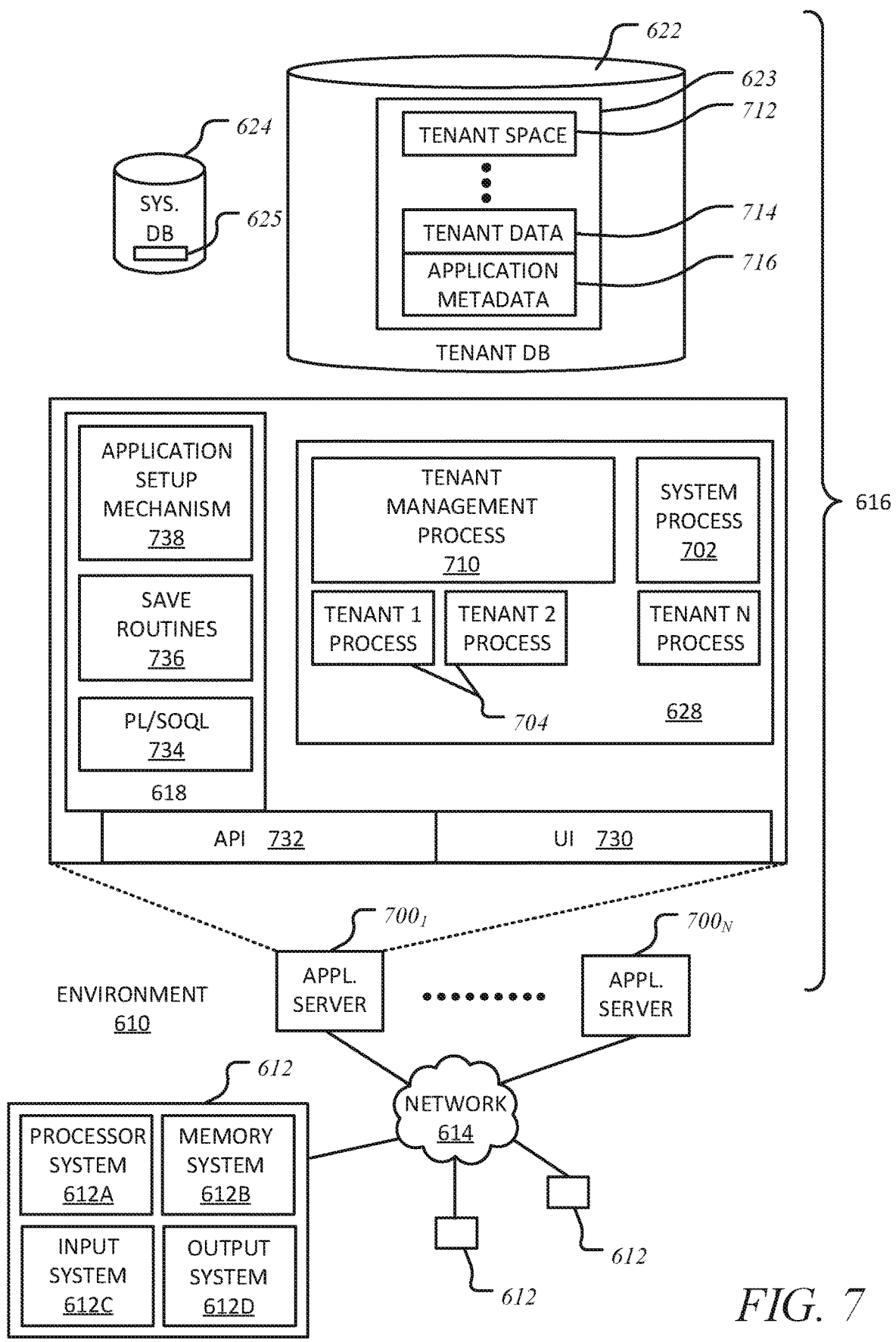
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700₁-700_N, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server 700₁ might be coupled via the network 614 (e.g., the Internet), another application server 700_{N-1} might be coupled via a direct network link, and another application server 700_N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method for multi-column indexing in a database environment, the method comprising:

receiving, by a multi-column indexing server computer, a query having one or more search terms corresponding to a tenant and a request for multi-column indexes of a database;

receiving, by the multi-column indexing server computer, multiple custom fields associated with an application running at a computing device, wherein the multiple custom fields are received in a specified sort order;

dynamically building, by the multi-column indexing server computer, the multi-column indexes of the multiple custom fields corresponding to multiple intrinsic datatypes stored in multiple custom field columns of a shared table, wherein the multi-column indexes are built automatically without having to depend on one or more standards associated with structures relating to database, the one or more standards including data definition language standards, wherein each custom field column of the shared table is annotated with one or more attributes including an intrinsic datatype having one or more of a number, a data, and a string, wherein the multiple intrinsic datatypes are converted into a generic-indexable datatype to preserve the specified sort order;

building, by the multi-column indexing server computer, a sorted index in a specified order in a multi-column indexable table, wherein the multi-column indexable table includes (1) a partial copy of data received from multiple tenants associated with the shared table, (2) multiple participation keys corresponding to the multiple tenants, wherein each participation key identifies a tenant and one or more rows of the multi-column indexable table associated with the tenant, and (3) a fixed-width indexable column to hold one or more data portions that are removed from the data for one or more accuracies and fitted to the fixed-width indexable column;

scanning, by the multi-column indexing server computer, contents of the sorted index to identify and filter out one or more false hits associated with the removal of the one or more data portions; and responding, by the multi-column indexing server computer, to the query by converting the one or more search items into the generic-indexable datatype against a partition of a sorted multi-column index built over the multi-column indexable table.

2. The method of claim 1, further comprising: mapping the multiple custom fields to multiple custom field columns of a corresponding database, wherein one or more of the multiple custom field columns mapping to each custom field is included in the preserved specified sort order, wherein the custom fields include custom fields identified, indexed, and submitted using an interface, wherein the interface includes one or more of a user interface, an application programming interface (API), and a Representational State Transfer (REST) API, wherein the user interface includes a Web browser.

3. The method of claim 2, further comprising:
annotating each column with one or more attributes including one or more of a datatype and a range of coverage, wherein the datatype includes one or more of a number, a date, and a string;
scanning a library of functions for each column to determine a pair of functions that matches the one or more attributes, wherein the pair of functions includes an encoder function and a decoder function; and
generating one or more metadata tables having metadata serving as a reference metadata to identify one or more of an original order of the multiple custom field columns, a number of the multiple custom field columns, original datatypes, the encoder function, the decoder function, and identifying information of the multiple tenants, wherein the metadata is used to retrieve data from the multiple custom field columns corresponding to index entries in the partition of the sorted index.

4. The method of claim 1, further comprising: maintaining, within rows of the multi-column indexable table, multiple tenant participation keys corresponding to the multiple tenants, wherein each participation key to identify a tenant and one or more rows associated with the tenant and bridge the one or more rows.

5. The method of claim 1, wherein the specified sort order comprises a natural sort order that is determined by a linguistic locale of multiple linguistic locales, the multi-column indexes to index multi-lingual data independent of the multiple linguistic locales, wherein the linguistic locale includes a language.

6. A database system comprising:
a multi-column indexing server computer having a processor; and
memory coupled to the processor, the memory having stored thereon instructions, wherein the instructions are executed by the processor to:
receiving a query having one or more search terms corresponding to a tenant and a request for multi-column indexes of a database;
receive multiple custom fields associated with an application running at a computing device, wherein the multiple custom fields are received in a specified sort order;
dynamically build multi-column indexes of the multiple custom fields corresponding to multiple intrinsic datatypes stored in multiple custom field columns of a shared table, wherein the multi-column indexes are built automatically without having to depend on one or more standards associated with structures relating to database, the one or more standards including data definition language standards, wherein each custom field column of the shared table is annotated with one or more attributes including an intrinsic datatype having one or more of a number, a data, and a string, wherein the multiple intrinsic datatypes are converted into a generic-indexable datatype to preserve the specified sort order;
build a sorted index in a specified order in a multi-column indexable table, wherein the multi-column indexable table includes (1) a partial copy of data received from multiple tenants associated with the shared table, (2) multiple participation keys corresponding to the multiple tenants, wherein each participation key identifies a tenant and one or more rows of the multi-column indexable table associated with the tenant, and (3) a fixed-width indexable column to hold one or more data portions that are removed from the data for one or more accuracies and fitted to the fixed-width indexable column;
scan contents of the sorted index to identify and filter out one or more false hits associated with the removal of the one or more data portions; and
responding to the query by converting the one or more search items into the generic-indexable datatype against a partition of a sorted multi-column index built over the multi-column indexable table.

7. The database system of claim 6, wherein the processor is further to: map the multiple custom fields to multiple custom field columns of a corresponding database, wherein one or more of the multiple custom field columns mapping to each custom field is included in the preserved specified sort order, wherein the custom fields include custom fields identified, indexed, and submitted using an interface, wherein the interface includes one or more of a user interface, an application programming interface (API), and a Representational State Transfer (REST) API, wherein the user interface includes a Web browser.

8. The database system of claim 7, wherein the processor is further to:
annotate each column with one or more attributes including one or more of a datatype and a range of coverage, wherein the datatype includes one or more of a number, a date, and a string;
scan a library of functions for each column to determine a pair of functions that matches the one or more attributes, wherein the pair of functions includes an encoder function and a decoder function; and
generate one or more metadata tables having metadata serving as a reference metadata to identify one or more of an original order of the multiple custom field columns, a number of the multiple custom field columns, original datatypes, the encoder function, the decoder function, and identifying information of the multiple tenants, wherein the metadata is used to retrieve data from the multiple custom field columns corresponding to index entries in the partition of the sorted index.

9. The database system of claim 6, wherein the processor is further to: maintain, within rows of the multi-column indexable table, multiple tenant participation keys corresponding to the multiple tenants and record keys or pointer data to connect the data rows in the multi-column indexable table back to the shared table, wherein each participation key to identify a tenant and one or more rows associated with the tenant and bridge the one or more rows.

10. The database system of claim 6, wherein the specified sort order comprises a natural sort order that is determined by a linguistic locale of multiple linguistic locales, the multi-column indexes to index multi-lingual data independent of the multiple linguistic locales, wherein the linguistic locale includes a language.

11. A non-transitory machine-readable medium comprising a plurality of instructions which, when executed by a processing device, cause the processing device to perform operations comprising:
    receiving a query having one or more search terms corresponding to a tenant and a request for multi-column indexes of a database;
    receiving multiple custom fields associated with an application running at a computing device, wherein the multiple custom fields are received in a specified sort order;
    dynamically building multi-column indexes of the multiple custom fields corresponding to multiple intrinsic datatypes stored in multiple custom field columns of a shared table, wherein the multi-column indexes are built automatically without having to depend on one or more standards associated with structures relating to database, the one or more standards including data definition language standards, wherein each custom field column of the shared table is annotated with one or more attributes including an intrinsic datatype having one or more of a number, a data, and a string, wherein the multiple intrinsic datatypes are converted into a generic-indexable datatype to preserve the specified sort order; and
    building a sorted index in a specified order in a multi-column indexable table, wherein the multi-column indexable table includes (1) a partial copy of data received from multiple tenants associated with the shared table, (2) multiple participation keys corresponding to the multiple tenants, wherein each participation key identifies a tenant and one or more rows of the multi-column indexable table associated with the tenant, and (3) a fixed-width indexable column to hold one or more data portions that are removed from the data for one or more accuracies and fitted to the fixed-width indexable column;
    scan contents of the sorted index to identify and filter out one or more false hits associated with the removal of the one or more data portions; and
    responding to the query by converting the one or more search items into the generic-indexable datatype against a partition of a sorted multi-column index built over the multi-column indexable table.

12. The non-transitory machine-readable medium of claim 11, wherein the operations further comprise:
    mapping the multiple custom fields to multiple custom field columns of a corresponding database, wherein one or more of the multiple custom field columns mapping to each custom field is included in the preserved specified sort order, wherein the custom fields include custom fields identified, indexed, and submitted using an interface, wherein the interface includes one or more of a user interface, an application programming interface (API), and a Representational State Transfer (REST) API, wherein the user interface includes a Web browser;
    annotating each column with one or more attributes including one or more of a datatype and a range of coverage, wherein the datatype includes one or more of a number, a date, and a string;
    scanning a library of functions for each column to determine a pair of functions that matches the one or more attributes, wherein the pair of functions includes an encoder function and a decoder function; and
    generating one or more metadata tables having metadata serving as a reference metadata to identify one or more of an original order of the multiple custom field columns, a number of the multiple custom field columns, original datatypes, the encoder function, the decoder function, and identifying information of the multiple tenants, wherein the metadata is used to retrieve data from the multiple custom field columns corresponding to index entries in the partition of the sorted index.

13. The non-transitory machine-readable medium of claim 11, wherein the operations further comprise: maintaining, within rows of the multi-column indexable table, multiple tenant participation keys corresponding to the multiple tenants and record keys or pointer data to connect the data rows in the multi-column indexable table back to the shared table, wherein each participation key to identify a tenant and one or more rows associated with the tenant and bridge the one or more rows.

14. The non-transitory machine-readable medium of claim 11, wherein the specified sort order comprises a natural sort order that is determined by a linguistic locale of multiple linguistic locales, the multi-column indexes to index indexing multi-lingual data independent of the multiple linguistic locales, wherein the linguistic locale includes a language.

* * * * *